(12) United States Patent
Rose et al.

(10) Patent No.: US 9,635,895 B1
(45) Date of Patent: May 2, 2017

(54) SYSTEM AND METHOD FOR MAPPING WEARER MOBILITY FOR CLOTHING DESIGN

(71) Applicant: VF Imagewear, Inc., Nashville, TN (US)

(72) Inventors: Ben Rose, Royston (GB); Michael Murphy, Cambridge (GB)

(73) Assignee: VF IMAGEWEAR, INC., Nashville, TN (US)

( * ) Notice: Subject to any disclaimer, the term of this patent is extended or adjusted under 35 U.S.C. 154(b) by 255 days.

(21) Appl. No.: 14/066,501

(22) Filed: Oct. 29, 2013

(51) Int. Cl.
*G06F 19/00* (2011.01)
*A41H 3/00* (2006.01)

(52) U.S. Cl.
CPC .................................. *A41H 3/007* (2013.01)

(58) Field of Classification Search
CPC .. G06F 17/50; G06F 17/5018; G06F 2217/32; G06T 2210/16; A41H 3/007
USPC .................................................. 700/130–133
See application file for complete search history.

(56) References Cited

U.S. PATENT DOCUMENTS

| | | | |
|---|---|---|---|
| 4,539,585 A | | 9/1985 | Spackova et al. |
| 4,654,896 A | * | 4/1987 | Rinehart ............................ 2/163 |
| 4,885,844 A | * | 12/1989 | Chun ........................ A41H 1/02 223/68 |
| 5,530,652 A | * | 6/1996 | Croyle ..................... A41H 1/02 356/394 |
| 5,956,525 A | * | 9/1999 | Minsky ..................... A41H 1/02 33/15 |
| 6,101,424 A | | 8/2000 | Sawada |
| 6,415,199 B1 | * | 7/2002 | Liebermann ............. A41H 1/02 33/512 |
| 6,810,300 B1 | * | 10/2004 | Woltman ............ G06F 17/5018 700/132 |
| 7,012,202 B2 | | 3/2006 | Mizukoshi |

(Continued)

OTHER PUBLICATIONS

Arthur S. Iberall, "The Use of Lines of Nonextension to Improve Mobility in Full-Pressure Suits," Behavioral Sciences Laboratory, Aerospace Medical Research Laboratories, Aerospace Medical Division, Air Force Systems Command, Wright-Patterson Air Force Base, Ohio, Nov. 1964.

(Continued)

*Primary Examiner* — Nathan Durham
(74) *Attorney, Agent, or Firm* — McAndrews, Held & Malloy, Ltd.

(57) ABSTRACT

A method for mapping wearer mobility includes identifying common usage patterns and usage positions by the garment wearer, attaching markers used in motion capture photography to the bare skin of a test subject, and recording position and movement data of the test subject with a computer system while the test subject repeats the common usage patterns and usage positions. The position and movement data are processed to create an opportunity map which identifies stretch and compression areas of the test subject. Markers are attached to a garment worn by a test subject, and position and movement data are recorded while the test subject repeats the common usage patterns and usage positions. The data are analyzed to create a problem map which identifies stretch and compression areas of the garment. A mobility map is created based on the opportunity map and problem map that creates a garment design that reduces compression and stretch areas.

5 Claims, 7 Drawing Sheets

(56) References Cited

U.S. PATENT DOCUMENTS

| | | | |
|---|---|---|---|
| 7,079,134 | B2 | 7/2006 | Kung et al. |
| 7,099,734 | B2 | 8/2006 | Pieper et al. |
| 7,212,202 | B2 | 5/2007 | Weaver |
| 7,373,284 | B2 * | 5/2008 | Stabelfeldt ......... G06F 17/5018 345/419 |
| 7,385,601 | B2 * | 6/2008 | Bingham ............... A41H 3/007 345/419 |
| 7,406,259 | B1 | 7/2008 | Wilhelm |
| 7,634,394 | B2 | 12/2009 | Macura et al. |
| 7,657,340 | B2 * | 2/2010 | Lind ....................... A41H 3/007 345/419 |
| 7,937,253 | B2 * | 5/2011 | Anast ................. G06F 17/5018 345/474 |
| 8,116,896 | B2 * | 2/2012 | Ko ....................... D04H 1/4374 700/131 |
| 8,185,231 | B2 | 5/2012 | Fernandez |
| 8,330,823 | B2 | 12/2012 | Gordon |
| 8,355,811 | B2 * | 1/2013 | Isogai ................. G06F 17/5018 700/132 |
| 2004/0153195 | A1 * | 8/2004 | Watanabe ............. A41H 3/007 700/132 |
| 2005/0049741 | A1 * | 3/2005 | Dias ......................... D04B 7/32 700/141 |
| 2005/0264562 | A1 * | 12/2005 | Macura et al. ............... 345/420 |
| 2005/0267614 | A1 | 12/2005 | Looney et al. |
| 2005/0267615 | A1 | 12/2005 | Lavash et al. |
| 2007/0250203 | A1 * | 10/2007 | Yamamoto ............. G06T 19/00 700/132 |
| 2008/0071507 | A1 * | 3/2008 | Hodgins et al. .................. 703/6 |
| 2008/0249652 | A1 * | 10/2008 | Burr ....................... A41H 3/007 700/132 |
| 2008/0300502 | A1 | 12/2008 | Yang et al. |
| 2011/0191070 | A1 * | 8/2011 | Ramalingam ..................... 703/1 |
| 2012/0086783 | A1 | 4/2012 | Sareen |
| 2012/0095589 | A1 | 4/2012 | Vapnik |
| 2012/0102618 | A1 | 5/2012 | Burmeister et al. |
| 2012/0225718 | A1 | 9/2012 | Zhang |

OTHER PUBLICATIONS

Paul S. Adams et al., "Three Methods for Measuring Range of Motion While Wearing Protective Clothing: A Comparative Study," International Journal of Industrial Ergonomics, 12(1993), pp. 177-191.

Sang II Park et al, "Capturing and Animating Skin Deformation in Human Motion," School of Computer Science, Carnegie Mellon University, ACM Transaction on Graphics (SIGGRAPH 2006), 25(3), pp. 881-889; Jul. 2006.

Shen Jianhua et al., "Human Skin Deformation from Cross-Sections," Computer Graphics Lab, Swiss Federal Institute of Technology, 1994.

J. Mahmud et al., "An Innovative Tool to Measure Human Skin Strain Distribution in Vivo using Motion Capture and Delaunay Mesh," Journal of Mechanics, vol. 28, Issue 02, Jun. 2012, pp. 309-317.

Peter Sand et al., "Continuous Capture of Skin Deformation,", Laboratory for Computer Science, Massachusetts Institute of Technology, University of North Carolina, Chapel Hill, ACM, Inc., c2003, pp. 578-586.

* cited by examiner

SYSTEM AND METHOD FOR MAPPING WEARER MOBILITY FOR CLOTHING DESIGN

FIELD OF THE INVENTION

The invention relates generally to clothing design. More specifically, the present invention relates to a system and method for computerized mapping of wearer mobility for clothing design.

BACKGROUND ART

Garments designed for work uniforms tend to be subject to tightness and restrictions at various locations in the garment when the wearer performs various actions. In some jobs, these actions are commonly repeated and can cause discomfort to the wearer. A garment that is designed to provide a better fit for a wearer would have distinct advantages of providing greater comfort and a longer lifespan. Consequently, a process and system for designing garments responsive to the motions of the wearer is needed.

SUMMARY OF THE INVENTION

A system and method for mapping wearer mobility for clothing design is provided. The method comprises identifying common usage patterns and usage positions by the garment wearer, attaching markers used in motion capture photography to the bare skin of a test subject, recording position and movement data of the test subject with a computer system while the test subject repeats the common usage patterns and usage positions, processing the position and movement data to create an opportunity map which identifies stretch and compression areas of the test subject, attaching markers to a garment worn by a test subject, recording garment construction data of the garment worn by the test subject while the test subject repeats the common usage patterns and usage positions, analyzing garment construction data to create a problem map which identifies stretch and compression areas of the garment, creating a mobility map based on the opportunity map and problem map that creates a garment design that reduces compression and stretch areas.

Other aspects and advantages of the invention will be apparent from the following description and the appended claims.

BRIEF DESCRIPTION OF DRAWINGS

It should be noted that identical features in different drawings are shown with the same reference numeral.

DETAILED DESCRIPTION

Figure 1:
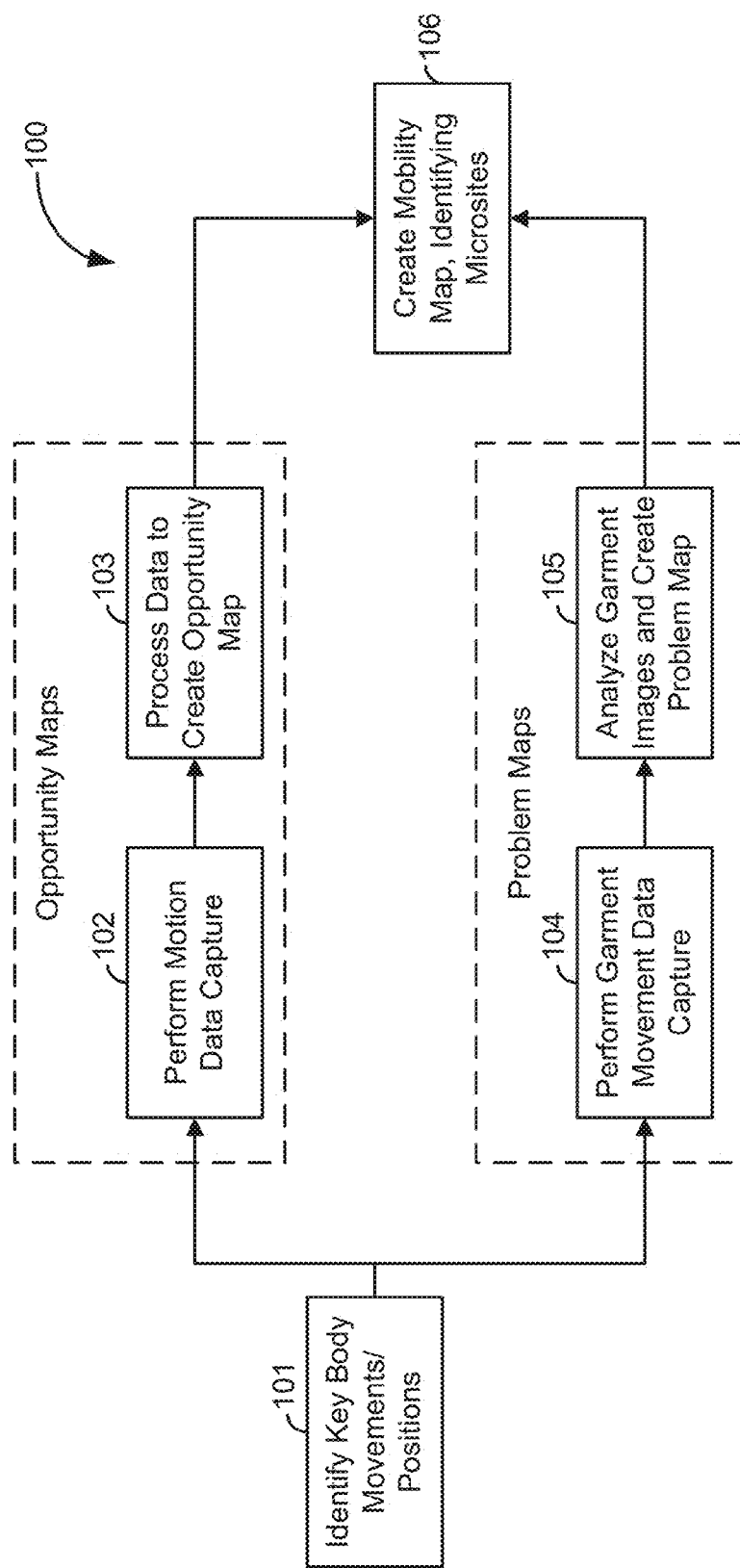
FIG. 1 shows a flow diagram of the process of one embodiment of the present invention.

A method and system for designing garments with consideration to the motion of the wearer has been developed. FIG. 1 depicts an exemplary embodiment of a method 100 according to the present disclosure. In step 101 of the method 100, a user of the method identifies the key body movements/positions required for a wearer of a particular garment to be designed. Exemplary key body movements include reaching forward and up, squatting, twisting while bending down, big steps, and bending.

Key body movements and positions may differ based upon the intended use of a garment under design. For example, a carpenter may have one set of associated body movements, mobility and garment/body interaction, while a bricklayer has a different associated set.

In step 102 of the method 100, motion data capture of skin movement is performed, while a test subject performs the key body movements identified in step 101. In one embodiment, motion data capture is performed by applying photographic markers to the test subject's body (bare skin) in a grid pattern. In one embodiment, the markers are placed one per square inch of skin. However, other densities of marker placement may be used in alternative embodiments. A greater marker density will typically result in a higher definition image and a correspondingly greater amount of data. The marker density is selected based on the resolution of data required to create the opportunity map, which lies typically in the range 1.0-2.0 dpi.

The test subject conducts the key movements and positions identified in step 101. A camera is then used to capture locations of the markers on the skin of the test subject while the test subject is performing the key body movements/positions. The locations are recorded digitally on a computer so that locations of stretch and compression of the skin/body are identified on the test subject. The specific mechanics of the marker application and motion capture photography are well known to one of ordinary skill in the art.

In step 103 of the method 100, the data captured in step 102 is processed to create a body map or "opportunity map." The opportunity map is created by locating the stretch and compression areas of the test subject's body/skin. The opportunity map is created by identifying areas of skin compression, skin tension, and areas of no stretching. Additionally, the direction of stretch or compression; the velocity of the movement at different points on the body; the relative position of movement of the limbs and body (e.g., angle between arm and torso); and the changes in body shape and size (e.g., flexing of muscles, movement of joints) are also identified. The opportunity map is discussed further with respect to FIG. 3 herein.

The data for the opportunity map may be collected by any suitable method that is known to one of ordinary skill in the art. These methods may include: body scanning by laser scanning, millimeter-wave imaging, image reconstruction (i.e., creating a 3D image from many 2D images), or patterned light imaging; point-tracking (i.e., motion capture technologies); use of armatures (i.e., suits comprising several different sensors worn by a model); and electromyography (EMG) (i.e., measuring muscle activity).

In step 104 of the method 100, garment movement data capture is performed. In this step, the test subject wears a test garment that has a repeated pattern in the fabric or coloring of the test garment for capturing distortions of the test garment while the test subject is performing the key body movements and positions. A camera records and measures the change in the test garment pattern, such that locations of test garment stretch and restriction are identified. The measurements are recorded digitally on a computer so that locations of tightness and restriction are identified on the test garment.

In step 105, a garment map (or "problem map") is created to identify the locations of tightness and restriction in the test garment. The problem map is created by identifying the areas of distribution of tension, the primary lines of tension, and change in dimension of the test garment (i.e., where the garment becomes larger or smaller due to stretch or compression). Further, areas of gathering, overlapping, puckering, pleating or folding of the test garment are also identified. Additional areas of restriction or tightness may be collected through interviews with the wearer and mapped on afterwards.

The data for the problem map may be collected by any suitable method known to one of ordinary skill in the art. These methods may include: image capture and processing (either manually or computerized) of a model in a patterned test garment with squares, circles, small dots, etc.; the use of stretch sensors on the garment itself; the use of pressure sensors underneath the test garment to measure tightness; computer simulation of the fabric performance; and user feedback to identify other areas of tightness and restriction.

Both the body maps and the garment maps are analyzed to identify locations where changes may be made to the garment, e.g., to allow for more stretch or more space in areas to significantly increase mobility. And finally, in step 106, mobility maps are created, with "micro sites" identified, which result in a better garment design, as discussed further herein with respect to FIGS. 6 and 7.

Figure 2:
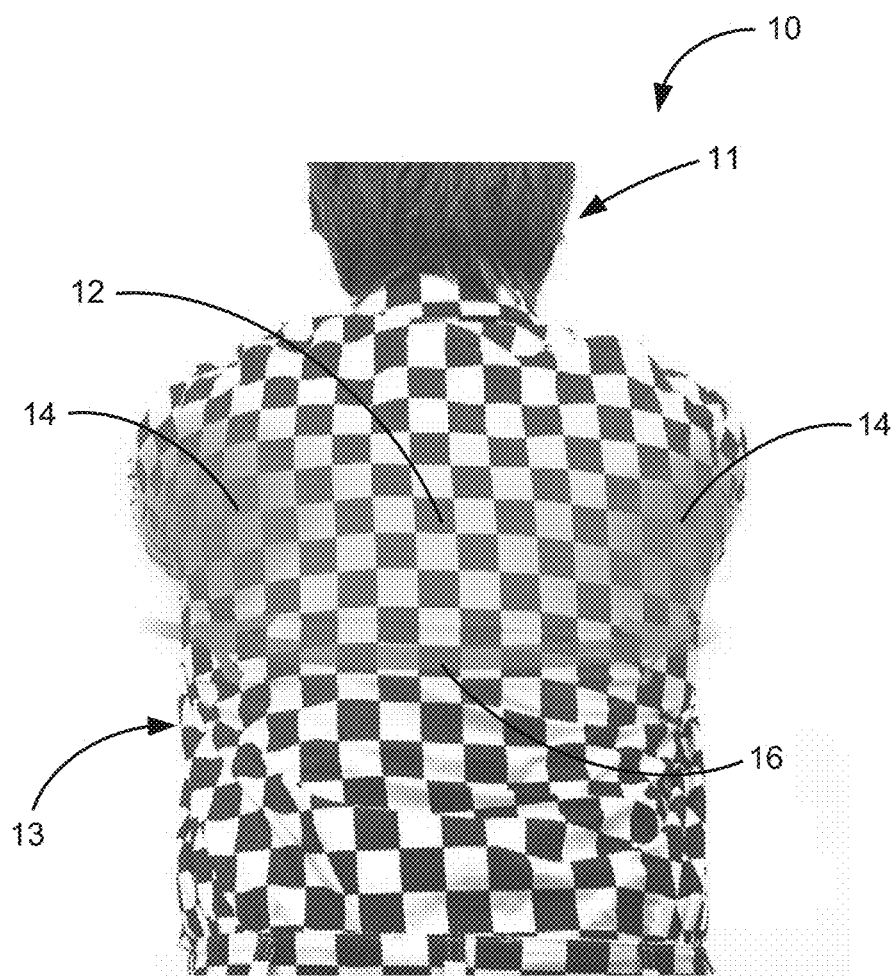
FIG. 2 shows an example of a photograph that illustrates a problem map of a shirt for a wearer in accordance with one embodiment of the present invention.

FIG. 2 shows an example of a photograph that illustrates a problem map 10 for a test garment 13 for a test subject 11. The test garment 13 comprises a pattern of black and white squares as shown. As the subject 11 moves to replicate the key body movements or positions associated with a particular garment design, the test garment 13 creates areas of tightness 12 and areas of restriction 14. The pattern in the test garment 13 allows for easy identification of the areas of tightness 12 and areas of restriction 14. The areas of tightness 12 and areas of restriction 14 are symptoms of lines of tension 16 in the test garment 13. Lines of tension 16 act through the fabric to restrict mobility.

The lines of tension 16 tend to loop between friction points on the garment, and have both a direction (indicated by the directional arrows on the line of tension 16 in FIG. 2) and magnitude of force. Releasing these lines of tension 16 would result in less tightness and restriction, and hence greater mobility.

Additionally, friction points (not shown) are identified as well. Friction points are points of the garment which are restricted from moving due to being 'pinned' to the body. They can be fixed at one place (e.g. shirt tucked in, cuffs), or appear as the body moves (such as friction between the elbow and material as the arm bends).

Figure 3:
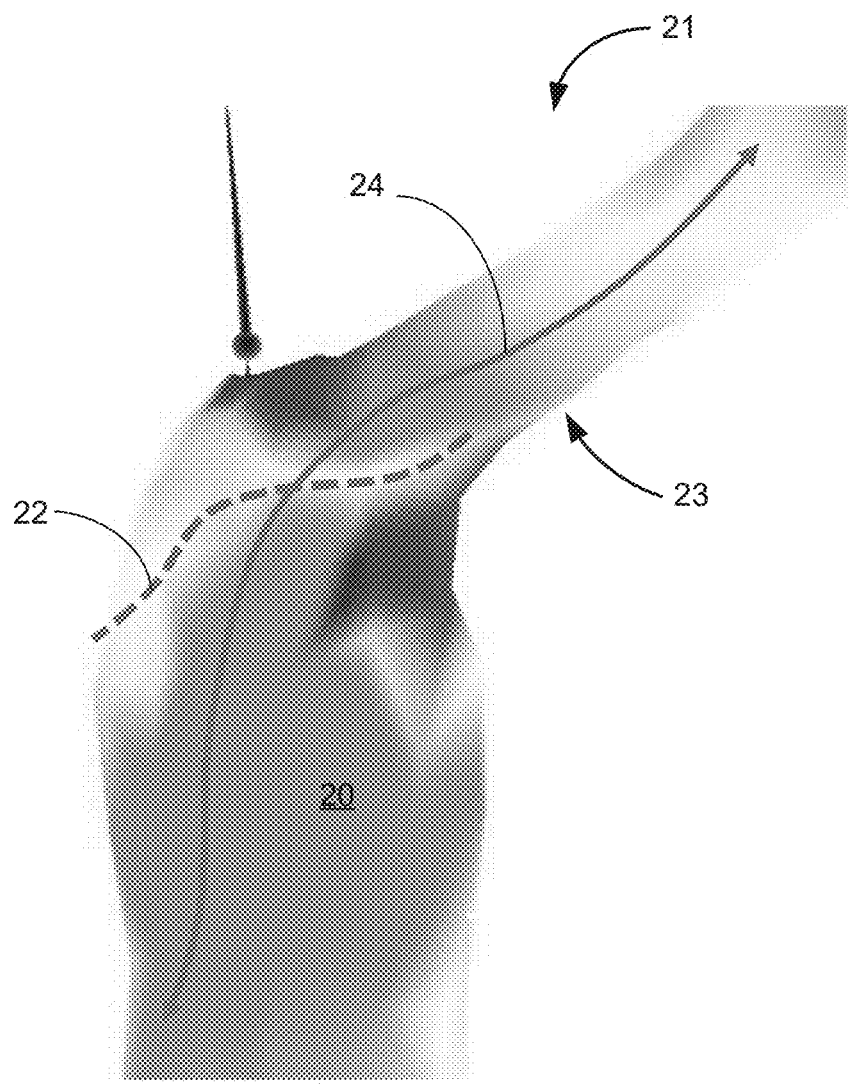
FIG. 3 shows an example of a digitized opportunity map for a wearer in accordance with one embodiment of the present invention.

FIG. 3 shows an example of a digitized opportunity map 21 of a test subject 23 in accordance with one embodiment of the present disclosure. In the map, the green areas represent areas of stretch and blue areas represent areas of compression. White areas represent areas of no tension. The opportunity map 21 shows that the body in motion causes changes in distance between fixed points on the surface of the skin and the angle between limbs. Mapping these changes will highlight the areas where the largest and smallest changes occur such as high stretch areas 20. The map then shows the identification of the constraints which the final garment must satisfy to enable mobility.

These constraints might be, for example, localized features where the body is expanding or contracting, or larger extension "loops" 24 across the body where a certain length of material would be required. However, some areas of the body do not extend at all during certain movements. These are lines of non-extension loops 22: loops around the body where the skin does not extend. These non-extension loops 22 are ideal for seam placement because seams are much less elastic than other areas of a garment, and are therefore appropriately co-located with areas of the body subject to less tension.

Figure 4A:
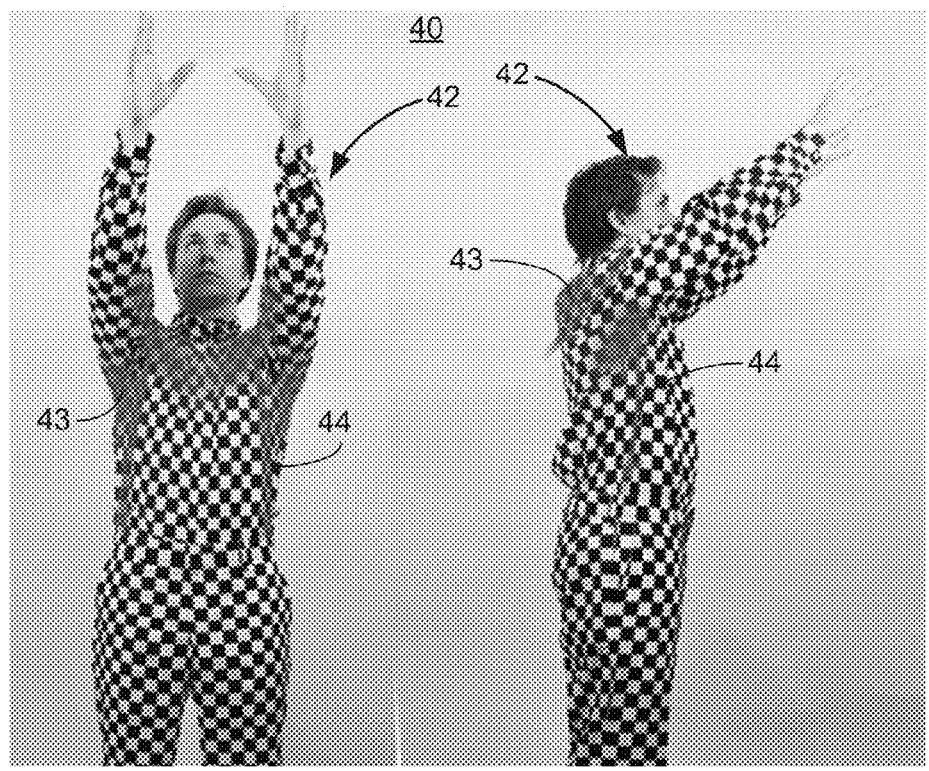
FIGS. 4A and 4B show examples of corresponding problem and opportunity maps of a wearer reaching upward in accordance with one embodiment of the present invention.
Figure 4B:
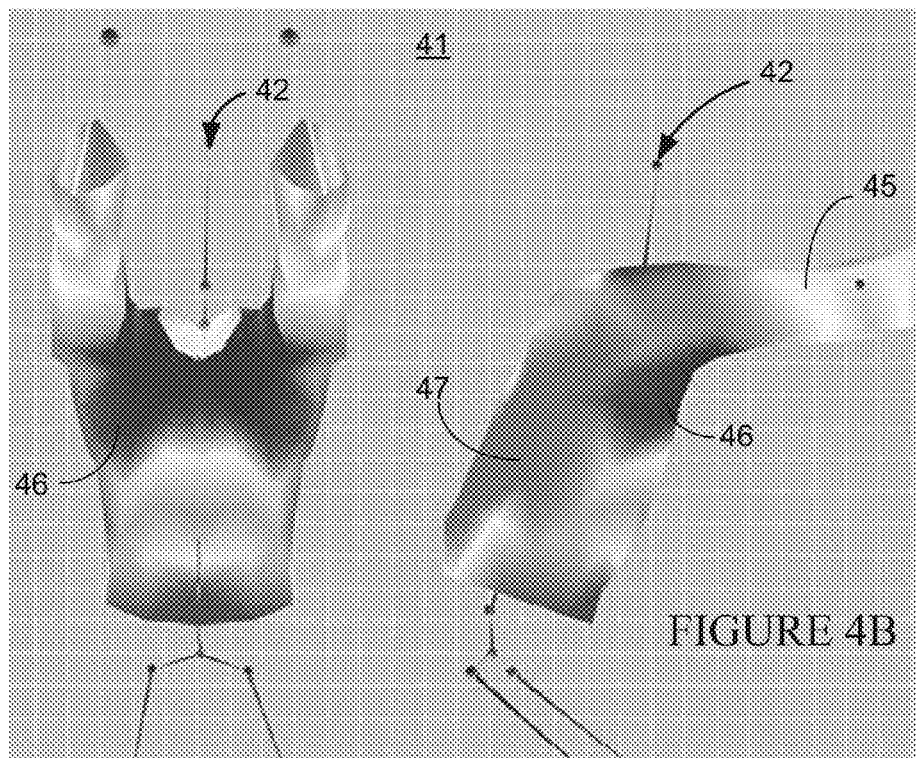

FIG. 4A depicts problem map 40 that corresponds with an opportunity map 41 depicted in FIG. 4B. In each of FIGS. 4A and 4B, the test subject 42 is reaching upward. In FIG. 4A, red areas 43 indicate areas of restriction. Blue lines 44 indicate lines of tension across the body, i.e., where the checks in the test garment are distorted. In FIG. 4B, white areas 45 are areas of no or low stretch; blue areas 46 are areas of high compression, and green areas 47 are areas of high stretch.

Figure 5A:
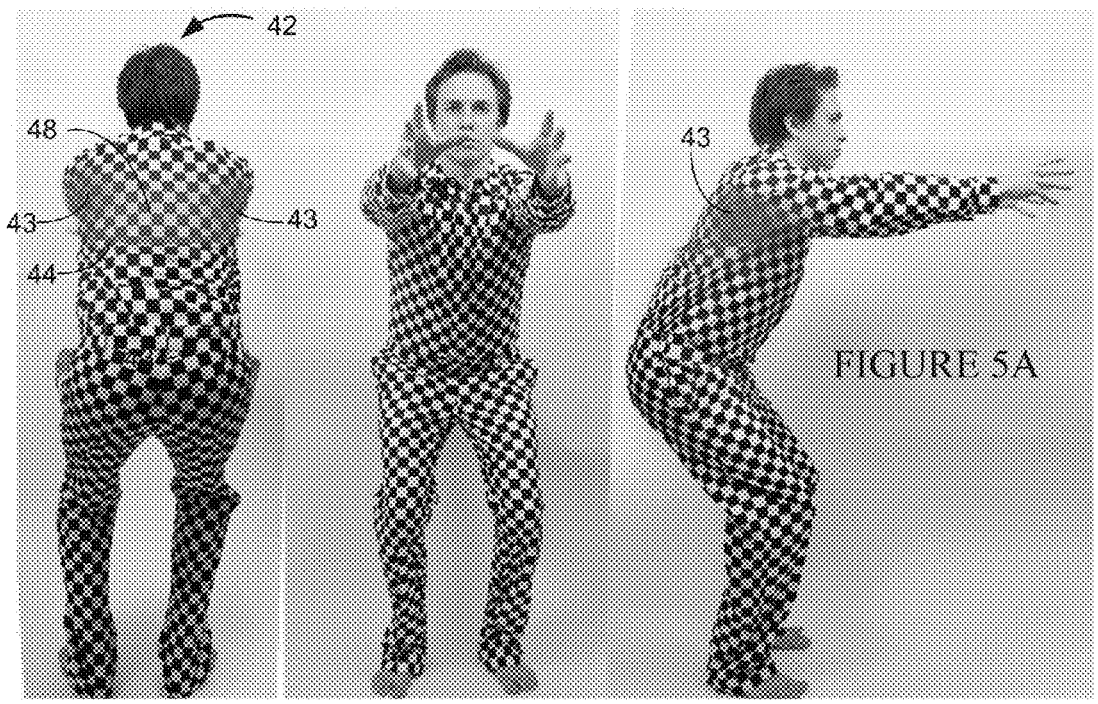
FIGS. 5A and 5B show examples of corresponding problem and opportunity maps of a wearer squatting downward in accordance with one embodiment of the present invention.
Figure 5B:
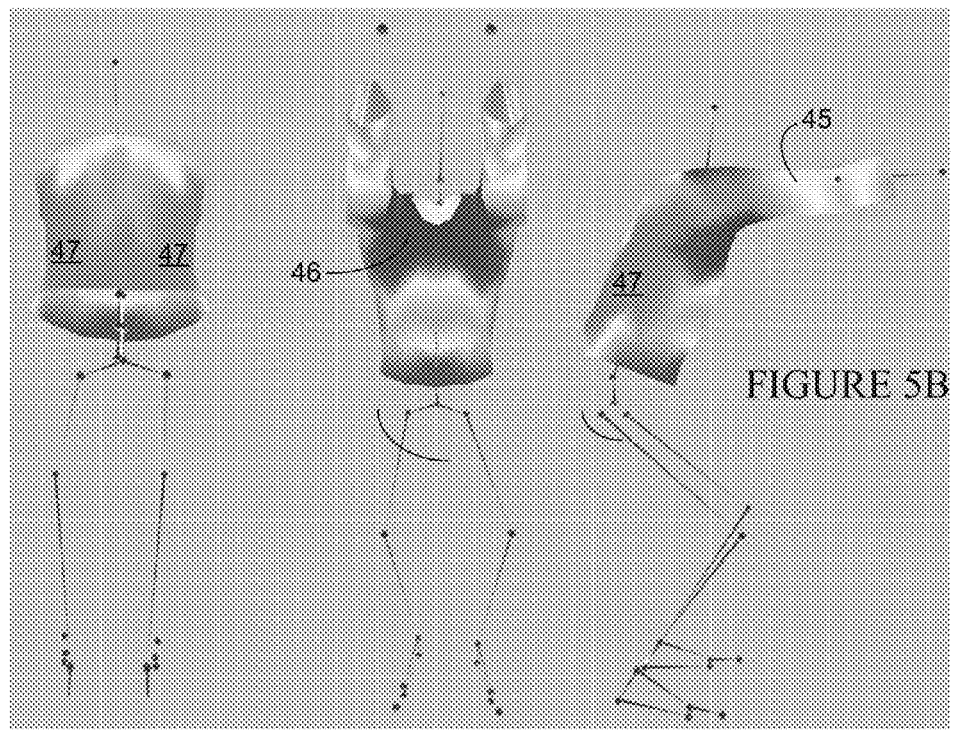

FIGS. 5A and 5B show examples of corresponding problem and opportunity maps of a test subject 42 squatting downward. The maps would then be used to analyze and design garments for many different functions. In FIG. 5A, red areas 43 indicate areas of restriction; orange areas 48 indicate areas of tightness; and blue lines 44 indicate lines of tension. In FIG. 5B, white areas 45 are areas of no or low stretch; blue areas 46 are areas of high compression, and green areas 47 are areas of high stretch. It should be understood that a wide variety of maps could be created for different movements and positions as desired.

Figure 6:
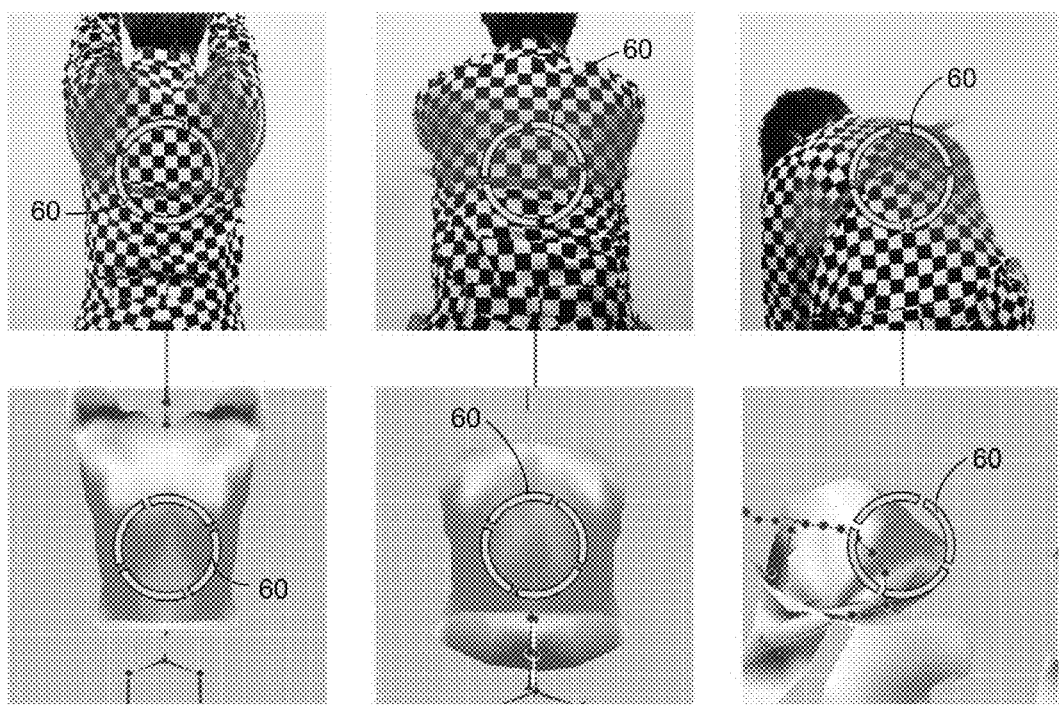
FIG. 6 show examples of corresponding problem and opportunity maps with highlighted micro sites in accordance with one embodiment of the present invention.

FIG. 6 shows examples of mobility maps, comprised of corresponding problem and opportunity maps with highlighted micro sites 60. A "micro site" is generally an identified location on the garment for improving mobility. Once these micro sites 60 are identified, adjustments may be made to the garment design to provide significant improvements in the wearer's comfort, performance and mobility.

Figure 7:
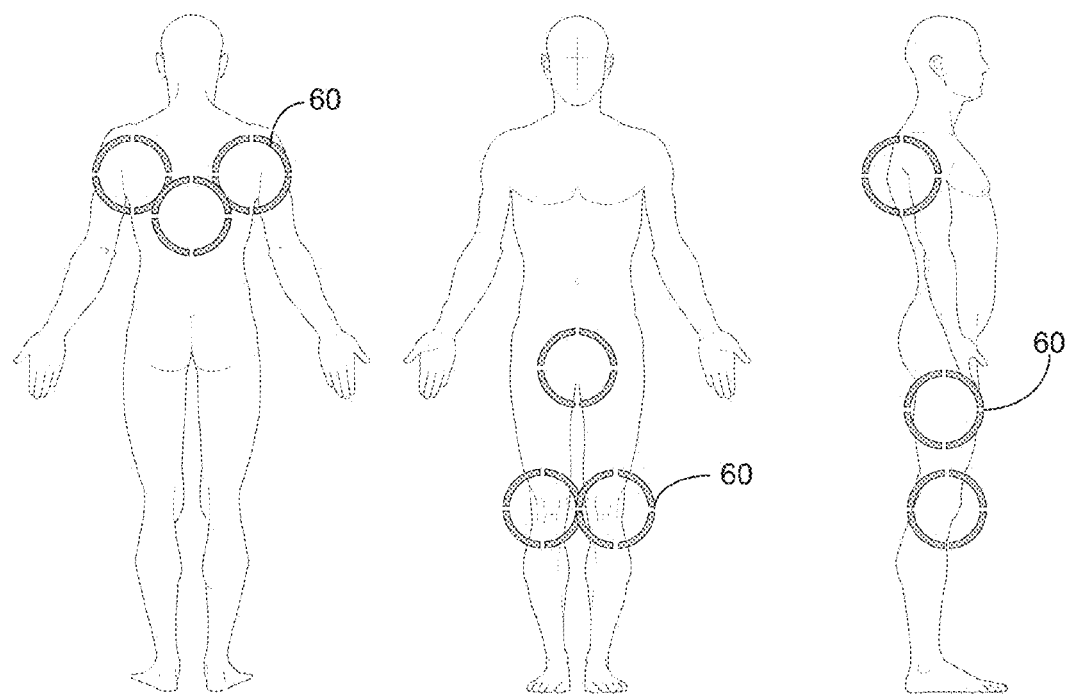
FIG. 7 show examples of highlighted micro sites at various points on a wearer's body in accordance with one embodiment of the present invention.

In one exemplary embodiment, there are three elements to identifying a micro site 60 or feature location for improving mobility of a garment design. First, areas of high stretch (as shown on the opportunity map in FIG. 3) indicating areas where the wearer would benefit greatest from improved mobility are identified with an opportunity map. Second, primary lines of tension (as shown on the problem map in FIG. 2) that show areas of high tension in the garment where relief from tension would improve mobility are identified with a problem map. Finally, the common locations reflected across several different movements are identified as a location on the garment for improving mobility with design changes or a micro site 60. For example the design of the garment could then be to locate the seam placement between lines of non-extension. FIG. 7 shows examples of highlighted micro sites at various points on a wearer's body.

In some embodiments of the invention, a "master" opportunity map may be created that identifies common areas of stretch and compression of a human body across a wide variety of movements and activities. The master opportunity map may then be used with a series of problem maps for different types of garments to identify microsites and then facilitate design changes without requiring a new opportunity map for each problem map. Likewise, a master problem map could be created for a specific garment and then used in comparison to an individualized opportunity map to create a personalized garment design for an individual wearer. It should also be understood that multiple master opportunity maps could be created based on height, weight, gender, body type, etc. so an individual could select an opportunity map that most closely corresponds to their specific characteristics. Also, multiple problem maps could be created for a specific garment that are based on the intended use of the garment (e.g., heavy construction work clothes) which allows for further customization of the clothing design.

As depicted in the exemplary embodiments, the present invention may be implemented by a modeling computer system to process the information and data gathered during the process. The volume of information processed, combined with the speed at which the information must be processed, makes the use of a modeling computer advantageous. The modeling computer system will typically have a processor, such as central processing unit (CPU), where the processor is linked to a memory, an input, and an output. A modeling computer may include several other components as well. For example, the memory components may include a hard disc for non-transitory storage of information, as well as random access memory (RAM). The input components may include a keyboard, a touchscreen, a mouse, and a modem for electronic communication with other devices. The output components may include a modem, which may be the same modem used for the input or a different one, as well as a monitor or speakers. Many of the different components may have varying physical locations, but they are still considered a computer for purposes of this description. For example, the memory may be on a hard drive in the same physical device as the processor, or the memory component may be remotely located and accessed as needed using the input and output. The memory may also have one more programs to carry out the modeling functions described previously. The memory components may also have one more databases containing the opportunity maps, the problem maps and the microsites along with related data.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for mapping the mobility of a garment wearer in order to aid in garment design, comprising:
    identifying common usage patterns;
    attaching markers to the skin of a test subject;
    recording position and movement data of the test subject with a computer system while the test subject performs the common usage patterns;
    processing the position and movement data to create an opportunity map which identifies stretch and compression areas of the test subject;
    causing the test subject to wear a garment;
    recording garment data while the test subject repeats the common usage patterns while wearing the garment;
    analyzing the garment data to create a problem map which identifies tightness and restriction areas of the garment;
    creating a mobility map based on both the opportunity map and the problem map; and
    using the mobility map to improve the mobility of a garment design.

2. The method of claim 1, where the markers are arranged in a grid pattern on the test subject.

3. The method of claim 1, wherein the garment worn by the test subject comprises a grid pattern.

4. The method of claim 1, where the garment data comprise lines of tension.

5. The method of claim 1, where the step of creating a mobility map comprises identifying one or more micro sites.

* * * * *